(12) United States Patent
Aiello et al.

(10) Patent No.: US 12,308,408 B2
(45) Date of Patent: *May 20, 2025

(54) BATTERY COOLING PLATE

(71) Applicant: Modine Manufacturing Company, Racine, WI (US)

(72) Inventors: Victor Aiello, Kenosha, WI (US); Kyle Shisler, Muskego, WI (US); Frances Kis, Yorkville, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,001

(22) Filed: May 6, 2024

(65) Prior Publication Data

US 2024/0291066 A1    Aug. 29, 2024

Related U.S. Application Data

(63) Continuation of application No. 17/260,782, filed as application No. PCT/US2019/043028 on Jul. 23, 2019, now Pat. No. 12,009,495.

(Continued)

(51) Int. Cl.
*H01M 10/6554* (2014.01)
*F28D 1/03* (2006.01)
(Continued)

(52) U.S. Cl.
CPC ...... *H01M 10/6554* (2015.04); *F28D 1/0333* (2013.01); *F28F 3/027* (2013.01);
(Continued)

(58) Field of Classification Search
CPC ........... H01M 10/6554; H01M 10/613; H01M 10/625; H01M 10/6568; H01M 10/617;
(Continued)

(56) References Cited

U.S. PATENT DOCUMENTS

| 1,564,538 A | 12/1925 | Dettenborn |
|---|---|---|
| 4,982,785 A | 1/1991 | Tomlinson |

(Continued)

FOREIGN PATENT DOCUMENTS

| CN | 2596035 Y | 12/2003 |
|---|---|---|
| CN | 1620591 A | 5/2005 |

(Continued)

OTHER PUBLICATIONS

Chinese Patent Office Second Action for application 201980051991.7 dated Oct. 10, 2022 (12 pages with translation).

(Continued)

*Primary Examiner* — Lisa S Park
(74) *Attorney, Agent, or Firm* — Michael Best & Friedrich LLP

(57) ABSTRACT

A battery cooling plate includes at least one planar heat transfer surface that is bounded by four edges. A coolant inlet port and a coolant outlet port are both arranged along a first one of the edges, and a coolant flow path extends through the battery cooling plate adjacent to the at least one planar heat transfer surface between the coolant inlet port and the coolant outlet port. The coolant flow path includes a first portion that extends along the entire length of a second, third, and fourth edge of the at least one planar heat transfer surface. The coolant flow path further includes a second portion that is arranged downstream of the first portion. The second portion of the coolant flow path is separated from the second, third, and fourth edges of the planar heat transfer surface by the first portion of the coolant flow path.

19 Claims, 3 Drawing Sheets

Related U.S. Application Data

(60) Provisional application No. 62/717,088, filed on Aug. 10, 2018.

(51) Int. Cl.
   *F28F 3/02*    (2006.01)
   *H01M 10/613*  (2014.01)
   *H01M 10/625*  (2014.01)
   *H01M 10/6568* (2014.01)

(52) U.S. Cl.
   CPC ....... *H01M 10/613* (2015.04); *H01M 10/625* (2015.04); *H01M 10/6568* (2015.04)

(58) Field of Classification Search
   CPC ........... H01M 50/209; H01M 10/6567; H01M 2220/20; H01M 10/6556; F28D 1/0333; F28D 1/0341; F28F 3/027; F28F 3/06; F28F 3/12; Y02E 60/10
   See application file for complete search history.

(56) References Cited

U.S. PATENT DOCUMENTS

| | | | |
|---|---|---|---|
| 6,199,626 | B1 | 3/2001 | Wu et al. |
| 11,760,165 | B2 | 9/2023 | Chu et al. |
| 2004/0069474 | A1 | 4/2004 | Wu et al. |
| 2005/0115701 | A1* | 6/2005 | Martin .................. F28F 13/12 165/170 |
| 2006/0291165 | A1 | 12/2006 | Flesch et al. |
| 2011/0094718 | A1 | 4/2011 | Yang |
| 2012/0082880 | A1 | 4/2012 | Koetting et al. |
| 2013/0014923 | A1 | 1/2013 | Girmscheid et al. |
| 2014/0020867 | A1 | 1/2014 | Moruzzi |
| 2015/0140388 | A1 | 5/2015 | Harada et al. |
| 2016/0036104 | A1 | 2/2016 | Kenney et al. |
| 2016/0238328 | A1 | 8/2016 | Amaya et al. |
| 2016/0248133 | A1 | 8/2016 | Iqbal et al. |
| 2016/0320141 | A1 | 11/2016 | Barfknecht et al. |
| 2017/0122679 | A1 | 5/2017 | Kenney et al. |
| 2018/0149433 | A1 | 5/2018 | Peskos et al. |

FOREIGN PATENT DOCUMENTS

| | | |
|---|---|---|
| CN | 102032830 A | 4/2011 |
| CN | 104406424 A | 3/2015 |
| WO | 2014053712 A1 | 4/2014 |
| WO | 2017136707 A1 | 8/2017 |

OTHER PUBLICATIONS

International Search Report with Written Opinion issued for the related Application No. PCT/US2019/043028 dated Oct. 24, 2019 (10 Pages).

First Office Action issued from the Chinese Patent Office for related Application No. 201980051991.7 dated May 7, 2022 (18 Pages).

Chinese Patent Office Decision of Rejection for application 201980051991.7 dated Feb. 22, 2023 (9 pages with translation).

* cited by examiner

BATTERY COOLING PLATE

CROSS-REFERENCE TO RELATED APPLICATIONS

This application is continuation of U.S. non-provisional patent application Ser. No. 17/260,782, filed on Jan. 15, 2021, which claims priority to PCT/US19/43028, filed Jul. 23, 2019, which claims the benefit of U.S. provisional patent application No. 62/717,088, filed on Aug. 10, 2018, the entire contents of which are hereby incorporated by reference in their entirety.

TECHNICAL FIELD

The present application relates to heat exchangers, and particularly to cooling plates for batteries.

BACKGROUND

Vehicles such as passenger automobiles are increasingly being electrified in order to replace or augment internal combustion engines. Such electric or hybrid-electric vehicles use electrical motors in order to provide, at least in part, the driving force for the wheels. The electrical power that is supplied to the motors is typically provided by a large number of batteries that are installed within the vehicle. Due to the large power loads associated with vehicular transport, the batteries from which such power is extracted experience substantial heating during operation and during charging. Batteries are known to be particularly sensitive to internal operating temperature, as the battery voltage will vary with the battery's internal temperature. As a result, batteries for electric vehicles often require substantial cooling during operation.

Battery cooling plates to accomplish the requisite cooling of the batteries typically operate by supplying one or more large and generally planar surfaces against which the batteries can be disposed. A liquid (or, in some cases, two-phase liquid-vapor) coolant is circuited through the battery cooling plate, and heat generated by the batteries is transferred through the surface into the coolant flowing through the plate, thereby reducing the temperature of the batteries to a more desirable level.

There are, however, still problems with known battery plates. Often the temperature across the cooling surface of the plate is not uniform, which causes some batteries disposed against the cooling surface to be at a different temperature than other batteries disposed against the cooling surface. This can result in impaired performance and/or reduced life of the batteries, since the batteries will not all be at an equal voltage and therefore will not share load equally. Among other reasons, this non-uniform surface temperature can be caused by the progressive heating of the coolant as it flows through the battery cooling plate, as well as by the presence of flow routing features formed into the otherwise flat surface of the battery cooling plate. Thus there is still room for improvement.

SUMMARY

In order to address the deficiencies of currently known battery cooling plates, the flow of coolant through a battery cooling plate is directed so that the cooling surface or surfaces of the plate are more uniform in temperature, leading to more consistent temperature in the batteries that are cooled by the battery cooling plate and, consequently better operation and extended life.

In at least some embodiments, a battery cooling plate includes at least one planar heat transfer surface that is bounded by four edges. In some, but not all, embodiments the battery cooling plate includes two such planar heat transfer surfaces. A coolant inlet port and a coolant outlet port are both arranged along a first one of the edges, and a coolant flow path extends through the battery cooling plate adjacent to the at least one planar heat transfer surface between the coolant inlet port and the coolant outlet port. The coolant flow path includes a first portion that extends along the entire length of a second, third, and fourth edge of the at least one planar heat transfer surface. The coolant flow path further includes a second portion that is arranged downstream of the first portion. The second portion of the coolant flow path is separated from the second, third, and fourth edges of the planar heat transfer surface by the first portion of the coolant flow path.

The convective heat flux (i.e. the rate of convective heat transfer per unit area) to the coolant along the first portion of the coolant flow path is preferably lower than the convective heat flux along the second portion of the coolant flow path. This leads to a greater temperature difference between the coolant and the planar heat transfer surface along the first portion than along the second portion. Since the coolant gradually warms as it passes through the battery cooling plate from the inlet to the outlet, having a greater temperature difference between the heat transfer surface and the coolant when the coolant is colder (e.g. close to the inlet) and a lesser temperature difference between the heat transfer surface and the coolant when the coolant is warmer (e.g. close to the outlet) can result in a more uniform temperature across the heat transfer surface.

In some such embodiments, flow turbulating features are arranged along the second portion of the coolant flow path. In some embodiments the majority of the first portion of the coolant flow path is absent of flow turbulating features. As a result, the convective heat flux along the first portion of the coolant flow path can be reduced relative to the convective heat flux along the second portion.

In some embodiments, the coolant inlet port is arranged at the intersection of the first edge and one of the second, third, and fourth edges.

In some embodiments, the first portion of the coolant flow path additionally extends along a part of the first edge. In some such embodiments the battery cooling plate includes a coolant outlet manifold that is also arranged along a part of the first edge, adjacent to that segment of the first portion of the cooling flow path that extends along the a part of the first edge. The coolant outlet manifold is hydraulically separated from that segment of the first portion of the coolant flow path, so that coolant flowing along the coolant flow path is directed through the second portion of the coolant flow path prior to reaching the coolant outlet manifold.

In some embodiments, the battery cooling plate additionally includes one or more turbulating inserts that are arranged within the battery cooling plate. The second portion of coolant flow path extends through the turbulating insert or inserts, while the first portion of the coolant flow path extends along an outer periphery of the turbulating insert or inserts. In some embodiments the first portion of the coolant flow path is at least partially defined by the outer periphery of the one or more turbulating inserts.

In at least some embodiments, the second portion of the coolant flow path includes a first pass and a second pass. Coolant flowing along the first pass is directed away from the first edge, while coolant flowing along the second pass is directed towards the first edge. In at least some such embodiments the first pass and the second pass are separated by a flow barrier that is integrally formed into at least one of the turbulating inserts.

In at least some embodiments, a battery cooling plate includes first and second planar walls that are spaced apart to define a coolant volume therebetween. At least two turbulating inserts are arranged within the coolant volume, and are joined to the first and second planar walls. The turbulating inserts collectively have a rectangular outer periphery. A coolant flow path extends through the coolant volume, and includes a first portion that does not extend through the turbulating inserts and a second portion that does extend through the turbulating inserts. In at least some such embodiments the first portion of the coolant flow path extends along at least three sides of the rectangular outer periphery of the turbulating inserts.

In some embodiments, an inwardly facing surface of the first planar wall has a surface area of which the percentage that is arranged within the rectangular outer periphery of the turbulating inserts is at least seventy percent. In some embodiments the percentage is over seventy-five percent, and in some particular embodiments the percentage is at least eighty percent.

In some embodiments, a first one of the turbulating inserts provides at least one of the at least three sides of the rectangular outer periphery of the turbulating inserts along which the first portion of the coolant flow path extends, and in some embodiments that first one of the turbulating inserts provides two of the three sides. A second one of the turbulating inserts provides at least one other of the at least three sides.

In some embodiments, each of the turbulating inserts is permeable to fluid flow in a low-pressure-drop direction and in a high-pressure-drop direction. Within each of the turbulating inserts the high-pressure-drop direction is oriented perpendicular to the low-pressure-drop direction. The high-pressure drop direction of a first one of the turbulating inserts is aligned with the low-pressure-drop direction of a second one of the turbulating inserts.

In some embodiments, a first one of the turbulating inserts provides a first one of the at least three sides of the rectangular outer periphery and a second one of the turbulating inserts provides a second one of the at least three sides of the rectangular outer periphery. The first one of the sides extends in the low-pressure-drop direction of the first one of the turbulating inserts and the second one of the sides extends in the low-pressure-drop direction of the second one of the turbulating inserts. In at least some such embodiments the low-pressure-drop directions of the first and the second turbulating inserts are perpendicular to each other.

In some embodiments, one of the turbulating inserts has a trapezoidal shape. Another one of the turbulating inserts has a corresponding trapezoidal shaped void into which the trapezoid shaped turbulating insert is arranged.

In some embodiments a single one of the turbulating inserts provides a first coolant flow pass and a second coolant flow pass along the second portion of the cooling flow path. The first coolant flow pass and the second coolant flow pass both extend in the low-pressure-drop direction of that single one of the turbulating inserts. The turbulating insert includes an integrally formed flow barrier that is impermeable to fluid flow and is arranged between the first and second coolant flow passes.

DETAILED DESCRIPTION

Figure 1:
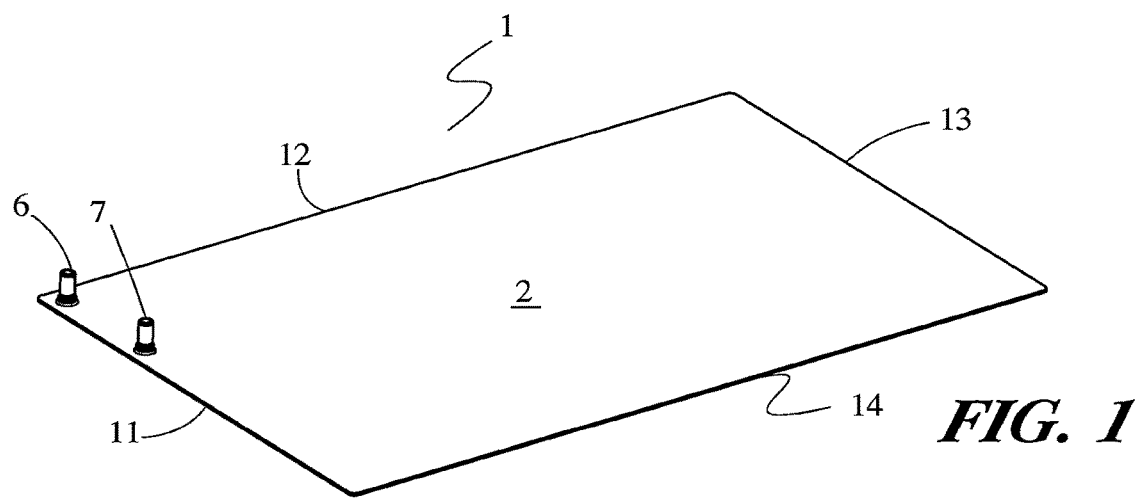
FIG. 1 is a perspective view of a battery cooling plate according to some embodiments of the invention.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A battery cooling plate 1, depicted in FIGS. 1-7, is particularly well-suited to the cooling of battery elements for use within electric vehicle applications. The battery cooling plate 1 includes at least one planar heat transfer surface 2, arranged on what will be referred to as a top surface of the battery cooling plate. Another similar planar heat transfer surface can optionally be provided on the opposing (bottom) surface of the battery cooling plate. It should be noted that reference to a "top" and a "bottom" surface of the battery cooling plate 1 are made with respect to the orientation of the battery cooling plate 1 within the figures, and do not necessarily indicate any particular orientation of the battery cooling plate as installed within a particular end use or application.

Once the battery cooling plate 1 is installed and operational, batteries or other heat-producing devices in need of cooling are disposed against the planar heat transfer surface or surfaces 2. Heat dissipated by such batteries or other heat-producing devices is transferred through the planar heat transfer surface or surfaces 2 and is removed by a flow of coolant that is directed through the battery cooling plate 1. As a result, a desirable operating temperature of the batteries or other heat-producing devices can be maintained despite the internal generation of heat. To that end, the battery cooling plate 1 is provided with a coolant inlet port 6 through which the coolant is directed into the battery cooling plate 1, and a coolant outlet port 7 through which the coolant is removed from the battery cooling plate 1 after having been heated by the batteries or other heat-producing devices.

In some applications, and particularly in electric vehicle applications, it can be especially desirable for the battery cooling plate 1 to have both a high thermal conductivity and a low weight. Consequently, it can be especially desirable for the battery cooling plate to be constructed out of aluminum alloys, since aluminum combines both high thermal conductivity and low density. In some particularly preferable embodiments, the battery cooling plate 1 is produced as a brazed aluminum assembly.

The planar heat transfer surface 2 has a rectangular shape and is bounded by four linear edges 11, 12, 13, and 14. Edges 11 and 13 extend in parallel with one another along what will be referred to as a width direction of the battery cooling plate 1, and are perpendicular to the edges 12 and 14, which extend along what will be referred to as a length direction of the battery cooling plate 1. In the exemplary battery cooling plate 1 the edges 12 and 14 are longer than the edges 11 and 13, although in other embodiments the edges 12 and 14 are equal in length or shorter than the edges 11 and 13.

The coolant inlet port 6 and the coolant outlet port 7 are arranged along the edge 11 and extend outwardly from the planar heat transfer surface 2. In some alternative embodiments one or both of the ports 6, 7 can extend outwardly from the opposing surface instead. The coolant inlet port 6 is additionally arranged along the edge 12, so that the port 6 is located at the intersection of the edges 11 and 12.

Figure 2:
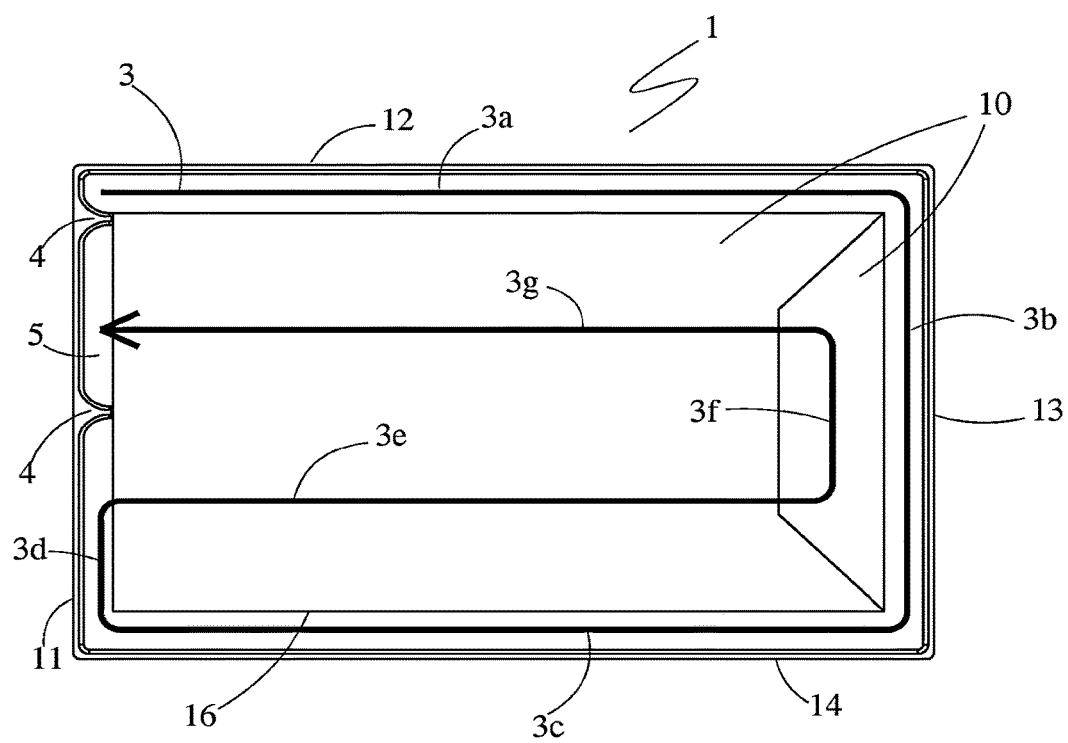
FIG. 2 is a plan view of the battery cooling plate of FIG. 1, with certain internal features revealed.

FIG. 2 depicts a plan view of the battery cooling plate 1 looking down from the top, with internal details of the battery cooling plate 1 revealed for ease of description. As can be seen, provided within the battery cooling plate 1 is a coolant volume 20, through which a coolant flow path 3 is defined. The coolant flow path 3 extends between the inlet port 6 and the outlet port 7, and is at least partially defined by one or more turbulating inserts 10 located within the coolant volume 20.

The coolant flow path 3 extends through the coolant volume 20 in a generally piecewise linear fashion, with a series of consecutively arranged segments indicated as 3a through 3g. These consecutively arranged segments can be grouped into a first portion of the coolant flow path 3 that includes the segments 3a, 3b, 3c, and 3d, and a second portion of the coolant flow path 3 that includes the segments 3e, 3f, and 3g, the second portion therefore being located downstream of the first portion. The first portion of the coolant flow path extends along the entire length of the edges 12, 13, and 14 of the planar heat transfer surface 2. The one or more turbulating inserts 10 define an outer periphery 16 that is spaced inwardly from the edges 11, 12, 13, and 14, so that the first portion of the coolant flow path 3 is arranged between those edges and the outer periphery 16. The second portion of the coolant flow path 3, in contrast, extends through the one or more turbulating inserts 10. The second portion of the coolant flow path 3 therefore is separated from the edges 12, 13, and 14 by the first portion of the coolant flow path 3.

The one or more turbulating inserts 10 provide flow turbulating features for the coolant, which will be described with particular reference to FIG. 3. Due to the arrangement of the turbulating inserts 10 within the coolant volume 20, these flow turbulating features are arranged along the second portion of coolant flow path, but the first portion of the coolant flow path is absent of such flow turbulating features. The flow turbulating features provide enhance heat transfer performance as the coolant moves along the second portion of the coolant flow path 3, so that the rate of heat transfer into the flow of coolant is enhanced along that portion of the flow path 3.

Figure 3:
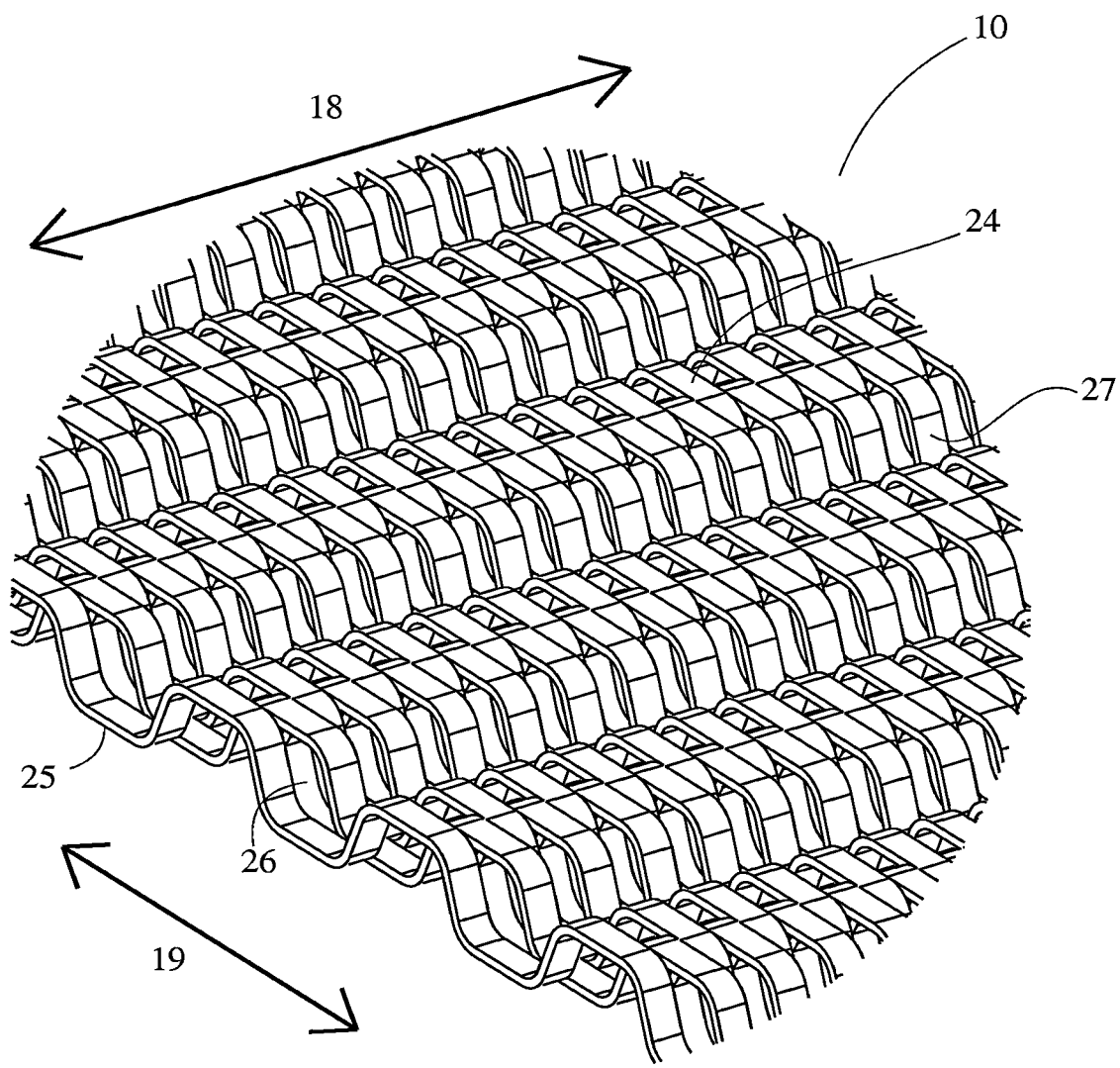
FIG. 3 is a perspective view of a portion of a turbulating insert for use in the battery cooling plate of FIG. 1.
Figure 4:
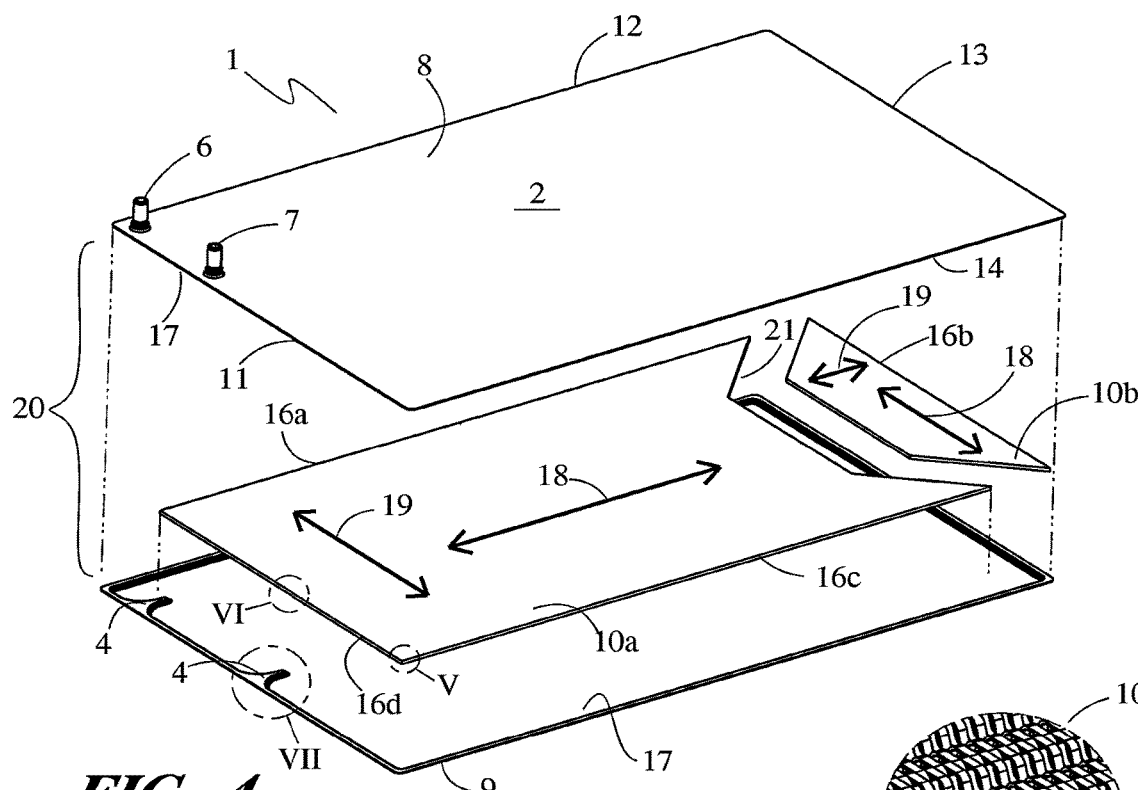
FIG. 4 is an exploded perspective view of the battery cooling plate of FIG. 1.

The turbulating inserts 10 can be of the lanced and offset variety, as depicted in FIG. 3. Such an insert is formed from a thin sheet of material that is formed (through, for example, a rolling process or a sequential stamping process) into a corrugated shape having alternating crests 24 and 25 extending in opposing directions along a first principal direction 19. The crests can have flat peaks, as shown in the exemplary embodiment of FIG. 3, or can alternatively have rounded peaks. Short pierces or lances are arranged along a second principal direction 18 that is perpendicular to the first principal direction 19, thereby separating the material into multiple short strips 27 that are connected only at short portions of the crests 24, 25. Along the principal direction 18, the strips 27 are offset in alternatingly opposing directions, so that flow openings 26 are provided between the adjacent strips 27.

As a result of the piercing and forming operations, the turbulating insert 10 is permeable to fluid flow in both of the principal directions 18 and 19. However, the resistance to fluid flow in the principal direction 19 is substantially greater (typically at least several times greater) than the resistance to fluid flow in the principal direction 18. The principal direction 18 is therefore referred to as the "low-pressure-drop" direction and the principal direction 19 is therefore referred to as the "high-pressure-drop" direction.

The battery cooling plate 1 is constructed with a first planar wall 8 and a second planar wall 9 which are provided by two separate metal plates. The planar walls 8 and 9 are spaced apart to define the coolant volume 20 therebetween, as can be seen in the exploded view of the battery cooling plate 1 in FIG. 4. The metal plate providing the planar wall 8 is entirely flat, while metal plate providing the planar wall 9 has a formed outer edge that extends towards the planar wall 8 in order to create a sealed periphery along the outer edges of the battery cooling plate. In some alternative embodiments both of the metal plates can be provided with complementary formed outer edges that join to provide that sealed periphery.

The exemplary embodiment of the battery cooling plate 1 includes two turbulating inserts, labeled as 10a and 10b, which are arranged within the cooling volume 20. The crests 24 of the turbulating inserts are bonded to an inwardly facing surface 17 of one of the planar walls 8, 9, and the crests 25 of the turbulating inserts are bonded to an inwardly facing surface 17 of the other one of the planar walls 8, 9, for example by braze joints. The turbulating insert 10a has a low-pressure-drop direction 18 that is aligned with the length direction of the battery cooling plate 1, i.e. aligned with the edges 12 and 14, and a high-pressure-drop direction 19 that is aligned with the width direction of the battery cooling plate 1, i.e. aligned with the edges 11 and 13. In contrast, the turbulating insert 10b has a low-pressure-drop direction 18 that is aligned with the width direction of the battery cooling plate 1, and a high-pressure drop-direction 19 that is aligned with the length direction of the battery cooling plate 1.

The turbulating insert 10b has a trapezoidal overall shape, characterized by two parallel edges of unequal length extending in the low-pressure-drop direction and two non-parallel edges of equal length extending at an angle to both the low-pressure-drop direction and the high-pressure-drop direction. The turbulating insert 10a is provided with a complementary trapezoidal-shaped void 21 into which the turbulating insert 10b is received, so that a combined turbulating insert having an overall rectangular outer periphery 16 is realized. The exterior profile of the turbulating insert 10b and the void 21 of the turbulating insert 10a can both be achieved by cutting away material from the inserts after the turbulating features have been formed.

Together, the turbulating inserts 10a and 10b define an outer periphery 16 of the turbulating inserts. The outer periphery 16 includes three linear edges 16a, 16c, and 16d provided by the turbulating insert 10a, and a linear edge 16b provided by the turbulating insert 10b. The linear edges 16a, 16b, 16c, and 16d are parallel to and inwardly spaced from the edges 12, 13, 14, and 11, respectively. The resulting spacing creates the previously described segments 3a, 3b, and 3c of the first portion of the coolant flow path 3. The spacing is preferably rather narrow, so that a substantial percentage of the surface area of the inwardly facing surfaces 17 is covered by the turbulating inserts 10 so that the rate of heat transfer to the coolant can be maximized. In some especially desirable embodiments, the percentage of the surface area of one of the inwardly facing surfaces 17 that is arranged within the rectangular outer periphery 16 of the turbulating inserts is at least seventy percent. In other embodiments that percentage is less than seventy percent.

Figure 5:
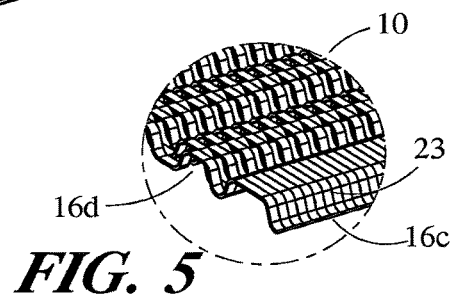
FIG. 5 is a detail view of that portion of the battery cooling plate within the circle labeled V in FIG. 4.
Figure 7:
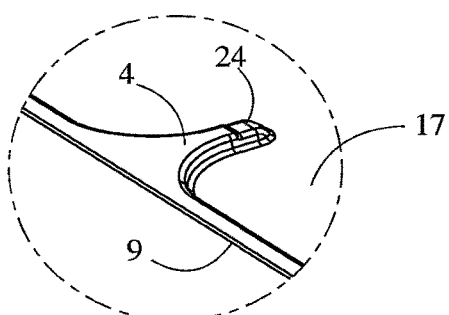
FIG. 7 is a detail view of that portion of the battery cooling plate within the circle labeled VII in FIG. 4.
Figure 6:
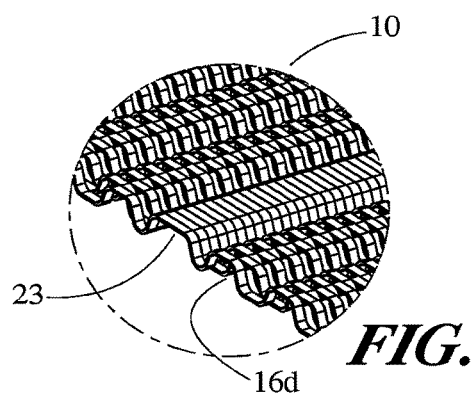
FIG. 6 is a detail view of that portion of the battery cooling plate within the circle labeled VI in FIG. 4.

In order to provide the requisite hydraulic separation between the coolant flowing along the first portion of the coolant flow path 3 and the coolant flowing along the second portion of the coolant flow path 3, the flow openings 26 between adjacent strips 27 along the linear edges 16a and 16c of the turbulating insert 10a and the linear edge 16b of the turbulating insert 10b are closed off prior to assembly of the turbulating inserts into the battery cooling plate 1. Such a closing of the flow openings 27 can be accomplished during the forming of the turbulating features, for example by re-offsetting alternating ones of the strips 27 so that all of the strips 27 along the given edge are offset in a common direction. The resulting edge profile 23 is indicated in FIG. 5, showing the edge 16c with the closed flow openings. The edges 16a, 16b, and 16c are consequently rendered impervious to fluid flow, thereby preventing any coolant from short-circuiting between the first portion of the coolant flow path 3 to the second portion of the coolant flow path 3, instead forcing the coolant to flow sequentially along the segments of the coolant flow path.

A similar profile 23 (shown in FIG. 5) is provided at approximately midway along the width direction 19 in the turbulating insert 10a and extends in the length direction 18 from the edge 16d to the void 21. This profile 23 creates a flow barrier that is integrally formed into the turbulating insert 10a to separate the segment 3e of the flow path 3 from the segment 3g, i.e. to separate the first and the second coolant flow passes of the turbulating insert 10a. The flow of coolant is thereby directed along the entirety of the segments 3e and 3g, and is directed from the segment 3e to the segment 3g only by way of the segment 3f provided within the turbulating insert 10b.

The planar wall 9 is provide with two embossments 4 extending inwardly into the coolant volume 20 to contact the opposing surface 17 of the planar wall 8. The two embossments 4 are arranged along the edge 11. A first one of the embossments 4 is aligned with the edge 16a of the turbulating insert 10a, and a second one of the embossments is arranged approximately midway along the edge 11. The space between the embossments 4 defines a coolant outlet manifold 5 into which the flow segment 3g discharges. The location of the coolant outlet port 7 is directly above the coolant outlet manifold 5, and the outlet port 7 is in fluid communication with the outlet manifold 5 so that the flow of coolant can be removed from the battery cooling plate 1 by way of the coolant outlet port 7. The edge 16d of the turbulating insert 10a is spaced away from the edge 11 to further define the coolant outlet manifold 5, as well as to define the segment 3d of the coolant flow path 3 between the edges 11 and 16d. The segment 3d is part of the first portion of the coolant flow path, which does not pass through the turbulating inserts 10. In this manner, the first portion of the coolant flow path extends along a part of the edge 11 as well as along the entire length of the edges 12, 13, and 14.

Each of the embossments 4 is provided with a step 24 (best seen in the detail view of FIG. 7) that is approximately equal in height to the material thickness of the turbulating inserts 10. This allows a portion of the embossments 4 to be received into, and joined to, those ones of the flow barrier profiles 23 that are located at the approximate midpoint of the turbulating insert 10a and at the edge 16a. This hydraulically separates the coolant outlet manifold 5 from both the flow segment 3a and from the flow segment 3d, to prevent the flow of coolant from flowing into the coolant outlet manifold 5 without passing along the entire coolant flow path 3. The coolant inlet port 6 is arranged between the edge 12 and the nearest one of the embossments 4 so that the flow of coolant entering the battery cooling plate 1 through the coolant inlet port 6 is directed to the beginning of the coolant flow path 3.

It should be observed that, although the turbulating inserts 10 are described in the exemplary embodiment with only a single insert 10a and a single insert 10b, either or both could alternatively be constructed of two or more turbulating inserts.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A coolant heat exchanger comprising:
    first and second planar walls that are spaced apart to define a coolant volume therebetween;
    at least two turbulating inserts arranged within the coolant volume; and
    a coolant flow path extending through the coolant volume and extending through the at least two turbulating inserts along at least three sides of an outer periphery of the coolant volume,
    wherein each of the at least two turbulating inserts is permeable to fluid flow in a low-pressure-drop direction and in a high-pressure-drop direction, the high-pressure-drop direction being oriented perpendicular to the low-pressure-drop direction, and wherein the low-pressure-drop direction of a first one of the at least two turbulating inserts is aligned with the high-pressure-drop direction of at least one of any remaining turbulating inserts of the at least two turbulating inserts, and wherein the first one of the at least two turbulating inserts has a shape and the remaining turbulating inserts of the at least two turbulating inserts form a void corresponding to the shape of the first one of the at least two turbulating inserts into which the first one of the at least two turbulating inserts is arranged.

2. The coolant heat exchanger of claim 1, wherein the shape is a trapezoid.

3. The coolant heat exchanger of claim 1, wherein the at least two turbulating inserts are brazed into place within the coolant volume.

4. The coolant heat exchanger of claim 1, wherein an interface between the first one of the at least two turbulating inserts and the remaining turbulating inserts of the at least two turbulating inserts is diagonal with respect to the low-pressure-drop direction and is diagonal with respect to the high-pressure-drop direction.

5. The coolant heat exchanger of claim 1, wherein the at least two turbulating inserts are joined to the first and second planar walls.

6. The coolant heat exchanger of claim 1, wherein at least three sides of an outer periphery of the at least two turbulating inserts match the at least three sides of the outer periphery of the coolant volume.

7. The coolant heat exchanger of claim 6, wherein the first one of the at least two turbulating inserts provides a first one of the at least three sides of the outer periphery of the at least two turbulating inserts and wherein the remaining turbulating inserts of the at least two turbulating inserts provide a second one of the at least three sides of the outer periphery.

8. The coolant heat exchanger of claim 7, wherein the remaining turbulating inserts of the at least two turbulating inserts provide a third one of the at least three sides of the outer periphery of the at least two turbulating inserts.

9. The coolant heat exchanger of claim 8, wherein the first one of the at least three sides extends in the low-pressure-drop direction of the first one of the at least two turbulating inserts.

10. The coolant heat exchanger of claim 9, wherein the second one of the at least three sides extends in the low-pressure-drop direction of the remaining turbulating inserts.

11. The coolant heat exchanger of claim 10, wherein the third one of the at least three sides extends in the low-pressure-drop direction of the remaining turbulating inserts.

12. The coolant heat exchanger of claim 7, wherein the coolant flow path includes a first pass and a second pass, wherein coolant flowing along the first pass is directed to the first one of the at least three sides of the outer periphery, and wherein coolant flowing along the second pass is directed away from the first one of the at least three sides of the outer periphery.

13. The coolant heat exchanger of claim 1, wherein the coolant heat exchanger includes a coolant inlet port and a coolant outlet port, wherein the coolant flow path extends from the coolant inlet port to the coolant outlet port, and
wherein a flow barrier hydraulically separates the coolant inlet port from the coolant outlet port to define the coolant flow path.

14. The coolant heat exchanger of claim 1, the at least two turbulating inserts are brazed to a surface of one of the first and second planar walls, and
wherein the surface at least partially defines the coolant volume.

15. A coolant heat exchanger comprising:
first and second walls that are spaced apart to define a coolant volume therebetween;
at least two turbulating inserts arranged within the coolant volume; and
a coolant flow path extending through the coolant volume and extending through the at least two turbulating inserts along at least three sides of an outer periphery of the coolant volume,
wherein a first one of the at least two turbulating inserts has a trapezoidal shape and any remaining turbulating inserts of the at least two turbulating inserts form a trapezoidal void corresponding to the trapezoidal shape of the first one of the at least two turbulating inserts, and wherein the first one of the at least two turbulating inserts is arranged in the trapezoidal void.

16. The coolant heat exchanger of claim 15, wherein the at least two turbulating inserts include a corrugated shape having alternating crests, wherein an orientation of the corrugated shape defines a low-pressure drop direction and a high-pressure drop direction, and wherein the low-pressure drop direction of the first one of the at least two turbulating inserts is oriented perpendicularly to the low-pressure drop direction of at least one of the remaining turbulating inserts of the at least two turbulating inserts.

17. The coolant heat exchanger of claim 15, wherein the at least two turbulating inserts are brazed to a surface of one of the first and second walls,
wherein the surface at least partially defines the coolant volume,
wherein the coolant heat exchanger includes a coolant inlet port and a coolant outlet port, the coolant flow path extending from the coolant inlet port to the coolant outlet port, and wherein a flow barrier hydraulically separates the coolant inlet port from the coolant outlet port to define the coolant flow path.

18. The coolant heat exchanger of claim 15, wherein the first one of the at least two turbulating inserts is oriented generally perpendicularly to at least one of the remaining turbulating inserts of the at least two turbulating inserts.

19. The coolant heat exchanger of claim 15, wherein at least three sides of an outer periphery of the at least two turbulating inserts matches the least three sides of the outer periphery of the coolant volume.

* * * * *